(12) United States Patent
Meyers

(10) Patent No.: US 11,841,187 B2
(45) Date of Patent: Dec. 12, 2023

(54) MULTI-SENSOR CLOSED-LOOP REFRIGERATION CONTROL FOR FREIGHT CONTAINERS

(71) Applicant: Globe Tracker, ApS, Copenhagen (DK)

(72) Inventor: Richard Meyers, Longboat Key, FL (US)

(73) Assignee: Globe Tracker, ApS, Copenhagen (DK)

( * ) Notice: Subject to any disclaimer, the term of this patent is extended or adjusted under 35 U.S.C. 154(b) by 0 days.

(21) Appl. No.: 17/687,626

(22) Filed: Mar. 5, 2022

(65) Prior Publication Data

US 2022/0187013 A1 Jun. 16, 2022

Related U.S. Application Data

(63) Continuation of application No. 16/391,868, filed on Apr. 23, 2019, now Pat. No. 11,274,879.

(Continued)

(51) Int. Cl.
*F25D 29/00* (2006.01)
*F25D 11/00* (2006.01)
(Continued)

(52) U.S. Cl.
CPC ......... *F25D 29/003* (2013.01); *B65D 88/745* (2013.01); *F25D 11/003* (2013.01);
(Continued)

(58) Field of Classification Search
CPC .... F25D 29/003; F25D 11/003; F25D 29/008; F25D 2400/34; F25D 2700/123;
(Continued)

(56) References Cited

U.S. PATENT DOCUMENTS 6,976,368 B1 * 12/2005 Lamstaes ............... G01K 13/00
374/134
2006/0248904 A1 * 11/2006 Ludwig .............. B60H 1/00014
62/208

(Continued)

FOREIGN PATENT DOCUMENTS

| EP | 2799264 A1 * | 11/2014 | ......... B60H 1/00014 |
| EP | 3091318 A1 * | 11/2016 | ......... B60H 1/00014 |

(Continued)

*Primary Examiner* — Nelson J Nieves
(74) *Attorney, Agent, or Firm* — Ryan Alley IP

(57) ABSTRACT

Systems and methods can control refrigeration within a refrigerated freight container. Thermal sensor nodes can be positioned within the freight container. Temperature measurements can be wirelessly relayed from the sensor nodes to a gateway associated with the freight container. The received temperature measurements can be aggregated and logged at the gateway. Thermal models of the freight container and associated cargo loads can be established in response to the logged temperature measurements and loading plan for the foreign container. The refrigeration system can be controlled in response to processing the thermal models. The refrigeration system can be controlled to optimize compliance parameters associated with the cargo loads.

17 Claims, 4 Drawing Sheets

Related U.S. Application Data

(60) Provisional application No. 62/661,528, filed on Apr. 23, 2018.

(51) Int. Cl.
*B65D 88/74* (2006.01)
*G05D 23/19* (2006.01)
*G05D 23/20* (2006.01)

(52) U.S. Cl.
CPC ....... *F25D 29/008* (2013.01); *G05D 23/1902* (2013.01); *G05D 23/1917* (2013.01); *G05D 23/20* (2013.01); *F25D 2400/34* (2013.01); *F25D 2700/123* (2013.01)

(58) Field of Classification Search
CPC ........... G05D 23/1902; G05D 23/1917; G05D 23/20; B65D 88/745; B65D 2590/0083
See application file for complete search history.

(56) References Cited

U.S. PATENT DOCUMENTS

| | | | |
|---|---|---|---|
| 2007/0052241 A1* | 3/2007 | Pacy | B60H 1/00014 290/40 C |
| 2010/0000241 A1* | 1/2010 | Kitano | B60P 3/20 62/134 |
| 2012/0137710 A1* | 6/2012 | Reimann | F25D 17/045 29/890.035 |
| 2013/0271290 A1* | 10/2013 | Saenz | G05D 27/02 340/870.07 |
| 2014/0041399 A1* | 2/2014 | Gan | F25B 49/02 62/161 |
| 2015/0135737 A1* | 5/2015 | Cresswell | F25D 11/003 62/190 |
| 2015/0330679 A1* | 11/2015 | Bowdish | F01N 5/04 62/239 |
| 2017/0082335 A1* | 3/2017 | Jin | B60H 1/3232 |
| 2017/0234608 A1* | 8/2017 | Sato | F25D 17/06 454/75 |
| 2017/0292759 A1* | 10/2017 | Al-Hallaj | B60H 1/00014 |
| 2018/0156517 A1* | 6/2018 | Jin | F25D 11/003 |
| 2019/0003765 A1* | 1/2019 | Chen | B60H 1/00364 |
| 2019/0030987 A1* | 1/2019 | Li | B60H 1/00657 |
| 2019/0041115 A1* | 2/2019 | Rau | F24F 13/10 |
| 2019/0105964 A1* | 4/2019 | Yasar | B60H 1/00657 |
| 2019/0248205 A1* | 8/2019 | Moon | B64D 9/00 |
| 2019/0277558 A1* | 9/2019 | Adetola | B60H 1/00657 |
| 2020/0072538 A1* | 3/2020 | Woolf | G05D 23/1923 |
| 2020/0309440 A1* | 10/2020 | Poolman | B60H 1/3232 |
| 2020/0346572 A1* | 11/2020 | Merta | B60P 1/649 |

FOREIGN PATENT DOCUMENTS

| | | | | |
|---|---|---|---|---|
| EP | 3392084 A1 | * | 10/2018 | ........ B60H 1/00657 |
| EP | 3213960 B1 | * | 2/2020 | ......... B60H 1/00014 |

\* cited by examiner

MULTI-SENSOR CLOSED-LOOP REFRIGERATION CONTROL FOR FREIGHT CONTAINERS

RELATED APPLICATIONS

This application claims the benefit under 35 U.S.C. § 120, and is a continuation, of co-pending application Ser. No. 16/391,868, now U.S. Pat. No. 11,274,879, filed Apr. 23, 2019, which claims priority to Provisional Application 62/661,528, filed Apr. 23, 2018, such provisional application also being claimed priority to under 35 U.S.C. § 119. These applications are incorporated by reference herein in their entireties.

BACKGROUND

Freight containers, also known as cargo containers or intermodal containers, are standardized shipping containers operable for use across different modes of transport such as ships, railroad, or trucking. Refrigerated freight containers are used to transport cargo loads with thermal requirements, such as perishable food or pharmaceuticals. When a fault or error in operation of the refrigeration violates the thermal requirements of the refrigerated cargo loads, the cargo may be wasted. There is a need in the art for freight container closed-loop refrigeration control technology supporting multiple electronic sensors.

SUMMARY

Technologies are described herein for systems and methods to control refrigeration within a freight container. Thermal sensor nodes can be positioned within the freight container. Temperature measurements can be wirelessly relayed from the sensor nodes to a gateway associated with the freight container. The received temperature measurements can be aggregated and logged at the gateway. Thermal models of the freight container and associated cargo loads can be established in response to the logged temperature measurements and loading plan for the foreign container. The refrigeration system can be controlled in response to processing the thermal models. The refrigeration system can be controlled to optimize compliance parameters associated with the cargo loads.

It should be appreciated that the described subject matter may be implemented as an apparatus, a system, an article of manufacture, or methods/processes associated therewith. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
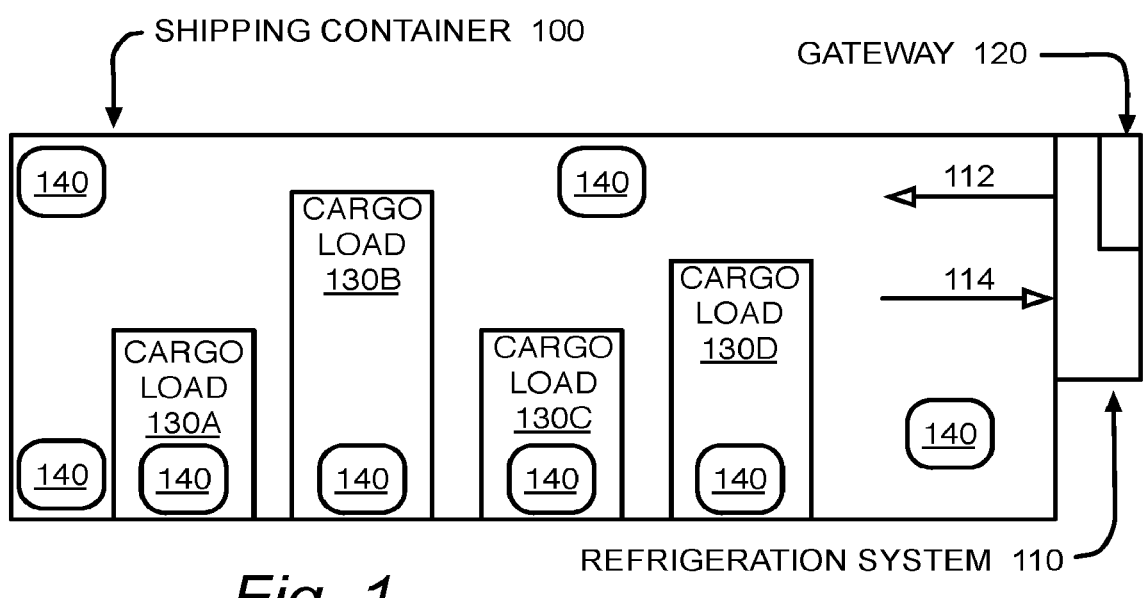
FIG. 1 illustrates a multi-sensor, closed-loop refrigeration control system in accordance with one or more embodiments presented herein.

The following description is directed to technologies for sensor-driven control of refrigeration systems associated with freight containers. Freight containers may also be known as cargo containers, intermodal containers, refrigerated truck trailers, trailers, and various similar terms collectively referred to here as "containers". Multiple wireless sensors may be provided within a container. The wireless sensors may also be embedded within the cargo carried by the container. These sensors can provide data such as detailed environmental measurements and dynamic thermal characteristics of the container. This data can be used in conjunction with predictive thermal models to better control refrigeration of the container. Thermal models may be used in conjunction with a gateway system that allows remote control of temperature set points. Refrigeration systems can be controlled to maximize thermal compliance of the container loads, minimize losses, guide load planning, and support other intelligent operations associated with refrigerated freight containers.

In the following detailed description, references are made to the accompanying drawings that form a part hereof, and which are shown by way of illustration specific embodiments or examples. Referring now to the drawings, in which freight container seal security using electromagnetic sensors will be presented.

FIG. 1 illustrates a multi-sensor, closed-loop refrigeration control system according to one or more embodiments of the technology presented herein. A shipping container 100, also known as a freight container, may be cooled by a refrigeration system 110. The refrigeration system 110 can pump a refrigerated air supply 112 into the shipping container 100. The refrigeration system 110 can draw return air 114 from the shipping container 100. The refrigeration system 110 can process the return air 114 by cooling, drying, and/or otherwise controlling humidity. Thus, the return air 114 may be transformed into the refrigerated air supply 112 to be provided back into the shipping container 100.

Cargo loads 130A-130D may be placed within the shipping container 100 for storage and/or transportation. The cargo loads 130A-130D may be referred to, collectively or in general, as cargo loads 130. The cargo loads 130 may be cooled by the refrigerated air supply 112 to prevent damage or spoiling.

The cargo loads 130 may be discrete items as well as continuous loads having similar characteristics such as bulk fresh produce, or other perishables packaged in similar or identical packaging. Each package may have a separate thermodynamic characteristics model, and collectively may have a combined model. In this case, the thermal properties of the cargo loads 130 may be best modelled as a collective single load, made up of similar discrete elements.

Sensor nodes 140 may also be placed within the shipping container 100. Multiple sensor nodes 140 may be distributed around the interior of the shipping container 100. One or more sensor nodes 140 may be positioned within, upon, or adjacent to one of the cargo loads 130. One, all, or any number of the cargo loads 130 may be associated with one or more sensor nodes 140. The sensor nodes 140 may be used to measure parameters, such as temperature and humidity, at multiple points within the shipping container 100. These multiple points can include points within, upon, or adjacent to respective cargo loads 130.

Measurement from the sensor nodes 140 may be wirelessly relayed to a gateway 120. The gateway 120 may comprise a remote-control system for the container 100 operable to directly, or indirectly, control refrigeration functions for the container 100. The gateway 120 may be associated with the shipping container 100 such that some, or all, of the sensor nodes 140 within the shipping container 100 are in wireless communication with the gateway 120.

Temperature values at various points within the shipping container 100 can be represented as a scalar field of temperature points. Temperatures along any path, plane, or surface within that field may be specified as a temperature gradient. One or more thermal models of the temperature field, and or the temperature gradients may be established. Thermal models may be based upon the thermal properties of the container itself, and various cargo loads 130 (including packaging), the operation of the refrigeration system 110, the size and position of the various cargo loads 130 (load plan), external temperatures (such as ambient values), known power consumption, and so forth. The thermal models may be used to predict and estimate the temperature at points between or beyond the sensor nodes 140 according to interpolation, extrapolation, and thermal propagation physics. Thermal propagation physics may involve air flow, temperatures of the refrigerated air supply 112, flow rates of the refrigerated air supply 112, duty cycle of the refrigeration system 110, material composition of the various cargo loads 130, density of the various cargo loads 130, materials of the shipping container 100, external temperatures of the shipping container 100, and the actual loading plan which may adversely affect homogeneous air-flow with the container, and so forth. Measurements of the temperatures at points given by the sensor nodes 140 can drive inputs to the thermal models and also verify the outputs of the thermal models. The models can establish three-dimensional temperature matrix at a high spatial resolution.

Each of the cargo loads 130A-130D can have specific parameters. For example, pharmacological loads may have a monetary value, a criticality metric (e.g., needed vaccines), thermal excursion limits, and susceptibility to excursion metrics. The thermal exclusion limits may specify minimum and maximum safe temperatures for the load. For example, a load may be safe between 0 and 20 degrees centigrade and must be kept within that range. Susceptibility to excursion may indicate tolerance of the load being exposed to transient temperature exceptions, how large of exceptions, at what frequency, and for what durations. For example, a pharmaceutical load may be specified to keep below 20 degrees centigrade but allow for an excursion to up to 23 degrees only up to one hour in duration before the cargo is compromised or damaged.

For collective cargo loads with multiple sensors located in different geometries which the load, a thermodynamic model can support maximizing the overall temperature compliance of the collective cargo load.

Challenges to maintain compliance with cargo loads 130 parameters may include external heating and dissipation, variations in internal cooling, disruption of internal thermal propagation due to load height, variations in cargo load density and thermodynamic properties, and so forth. Ultimately the control system must mitigate these challenges to minimize cost and/or loss impact.

Example parameters associated with food loads may include specification of mixed or homogeneous loads, freshness parameters (ripening cycles, first picked, first expired, first sold), agricultural product tracking (where harvested, when harvested, how stored, how slaughtered), marking for tracking (QR codes), USDA cold treatment automation process, and so forth.

The thermal models can be used to control the refrigeration system 110. Best-case control can seek to maximize compliance of an entire load. Best-case control can be maintaining within the thermal excursion limits of all cargo loads 130A-130D. If the control system cannot make that goal and has to sacrifice one or more of the cargo loads 130, knowledge of the monetary values of the various loads 130 can support decisions that minimize monetary loss. Similarly, criticality metrics can be used to minimize the loss of critical pharmaceutical loads such as vaccines or products that would take a long time to reproduce and/or risk health and welfare.

The thermal models can couple to an algorithm for intelligently controlling the refrigeration system. The algorithm can use sensor readings along with thermal modelling to optimize compliance, predict compliance, predict alarm conditions, determine critical parameters, and attempt to prevent compliance exceptions through intelligent refrigeration monitoring and control. The algorithm can generate alarms based on predicted temperature profiles. Predicting alarm conditions can allow the algorithm to set refrigeration parameter priorities. Mediation responses can leverage the timing and critically of alarms or proactively using predicted alarms.

The system can provide a load intelligence application to instruct a shipper on how to pack the cargo loads 130 to maximize compliance or minimize risk of loss. This can include loading order and load height within the container. The system can detect load violations. For example, when cargo nearest refrigerated air supply 112 is stacked too high and blocking airflow. The system can provide support to the shipper for establishing the cooling algorithm. The system can predict future system performance and may also provide alerts as appropriate.

System data can be provided in real-time using a Graphical User Interface. System can support set-up and management of alarms, customizing alarms, notifications and reports that can be shared securely and selectively.

The gateway 120 device can (directly or indirectly) communicate with global cellular network partners, report precise locations, and provide two-way monitoring and control. Cellular or satellite vessel networks may be leveraged for communications at sea. When there is no connection, the system can store data and transmit it once connectivity is restored.

In addition to temperature, the sensor nodes 140 may support various other integrated sensors, such as those providing location, humidity, shock, motion, tamper, or light exposure. The sensor nodes 140 can communicate from inside the shipping container 100 or from inside with cargo loads 130 themselves.

The system can benefit maintenance by reacting proactively to alarms and other issues thereby reducing maintenance costs. The system can support predictive maintenance to reduce component failure and repair requirements. The system can track warranty expiration dates to perform timely warranty check-ups.

The system can reduce terminal Pre-Trip Inspection (PTI) processes, which are usually performed on a refrigerated container before each use. Performing remote health checks to determining whether repair is necessary can support improved utilization and reduced repair costs.

The system can automate economy mode setting based on commodity type to reduce energy budgets. The system can maximize energy saving modes. The system can compare energy cost charged against actual usage based on a calculation of power consumption parameters and run-time. The system can identify which containers are running most efficiently. The system can determine and monitor best-in-class parameters for refrigeration system make and models.

The system can guide in refining various aspects refrigerated container logistics and operations. The system can support cross-check of actual set-points, ventilation, and humidity against asset owner's internal system. The system can optimize container utilization. The system can eliminate manual monitoring costs and errors. The system can reduce maintenance labor costs. The system can reduce monitoring charge. The system can reduce customer claims. The system can reduce handling costs. The system can identify quality of maintenance and repair on vessels and on land. The system can establish and monitor various makes and models of refrigerated containers. The system can manage user profiles for more efficient operations.

The system can support cargo handling and operations. The system can provide real-time alarm status on cold treatment shipments. The system can support remote change of temperature set point to avoid breach of protocol. The system can reduce handling cost. The system can increase cargo shelf life. The system can support quicker clearance through automated USDA approvals. The system can provide cargo-level temperature monitoring for better USDA and GDP compliance. The system can detect container breach for security. The system can reduce terminal quarantine time for USDA cold treatment operations. The system can provide customized real-time data to customers. The system can provide customized post-trip data to customers.

Figure 2:
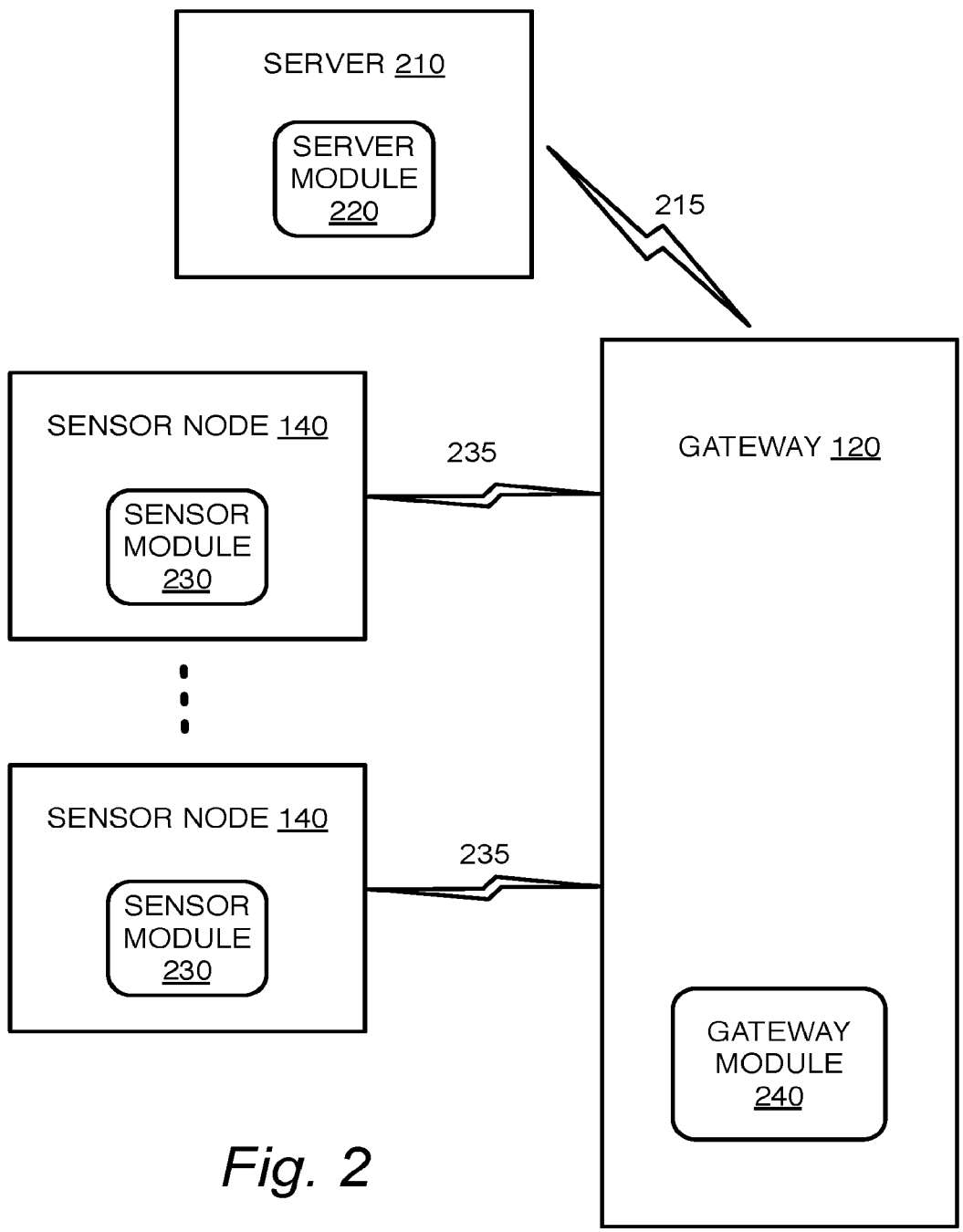
FIG. 2 illustrates modules and communication links within a multi-sensor, closed-loop refrigeration control system according to one or more embodiments of the technology presented herein.

FIG. 2 illustrates modules and communication links within a multi-sensor, closed-loop refrigeration control system according to one or more embodiments of the technology presented herein. Sensor nodes 140 may be located within a shipping container 100. Each sensor node 140 may operate according to one or more sensor modules 230 associated with the respective sensor node 140. Each sensor node 140 may be in wireless communications with a gateway 120. Wireless communications between the sensor node 140 and the gateway 120 may be supported by sensor wireless channel 235.

The gateway 120 may operate according to one or more gateway modules 240. One or more gateways 120 may be in wireless communications with a server 210. The server 210 may operate according to one or more server modules 220. Wireless communications between the gateway 120 and the server 210 may be supported by gateway wireless channel 215. The server 210 may be on ship or fixed, for example at port.

The gateway wireless channel 215 and the sensor wireless channels 235 may comprise wireless communication links or networks of wireless communication links. The gateway wireless channel 215 and the sensor wireless channels 235 may employ any of various wireless RF interfaces such as cellular/mobile (GSM, CDMA, 4G, LTE, 3G), global LoRa, LoRaWAN, GNSS (GPS, Galileo, GLONASS, BeiDou), GPS, Bluetooth, WiFi, satellite link, WLAN, WiMax, packet radio, software defined radio, and so forth.

Figure 4:
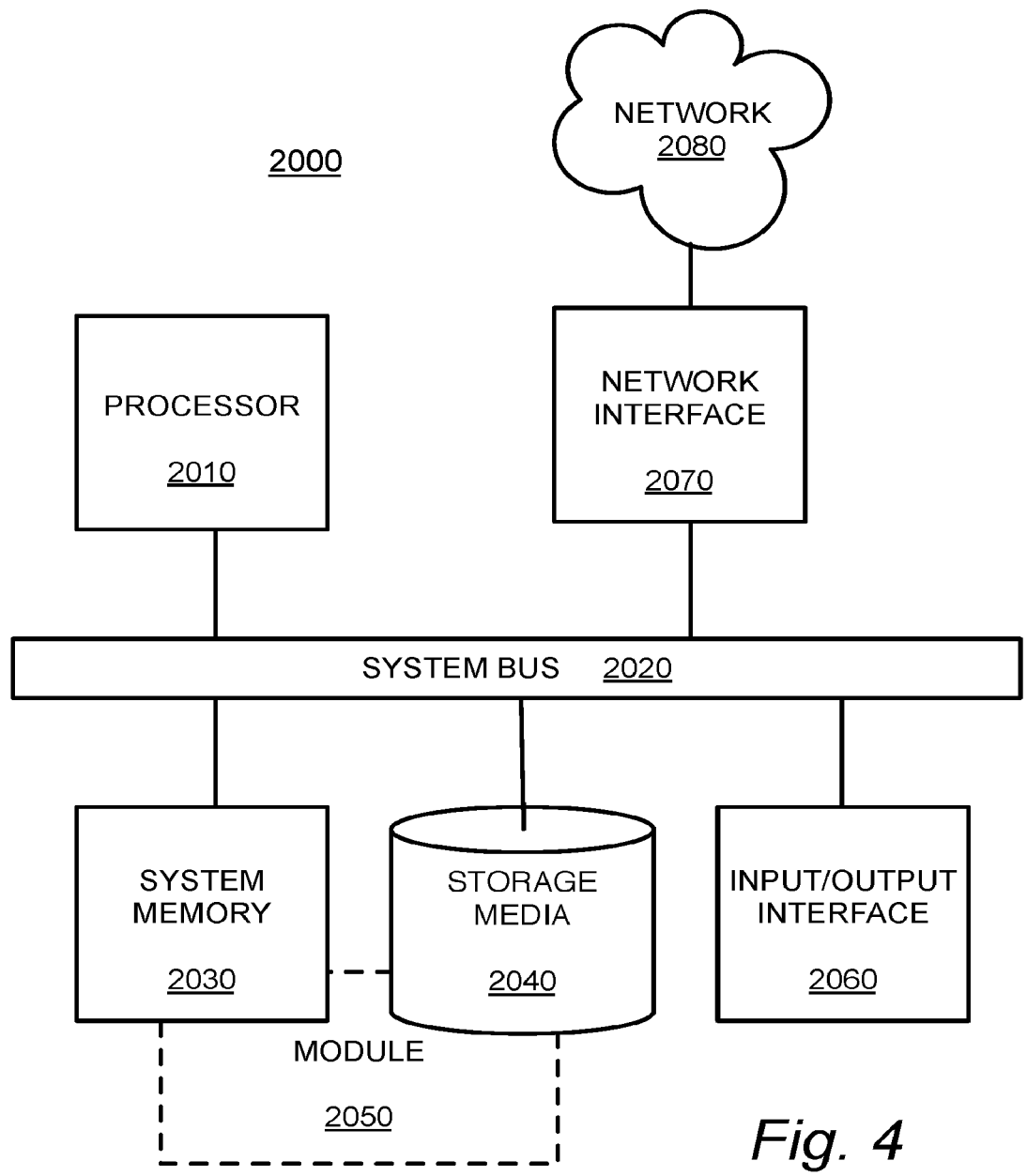
FIG. 4 is a block diagram depicting a computing machine and a module in accordance with one or more embodiments of the technology presented herein.

The gateway 120, sensor node 140, server 210, or any other systems associated with the technology presented herein may be any type of computing machine such as, but not limited to, those discussed in more detail with respect to FIG. 4. Furthermore, any modules (such as the server module 220, the sensor module 230, or the gateway module 240) associated with any of these computing machines or any other modules (scripts, web content, software, firmware, or hardware) associated with the technology presented herein may by any of the modules discussed in more detail with respect to FIG. 4. The computing machines discussed herein may communicate with one another as well as other computer machines or communication systems over one or more networks or communication links such as the gateway wireless channels 215 and/or the sensor wireless channels 235. These communication mechanisms may include any type of data or communications network including any of the network technology discussed with respect to FIG. 4.

Figure 3:
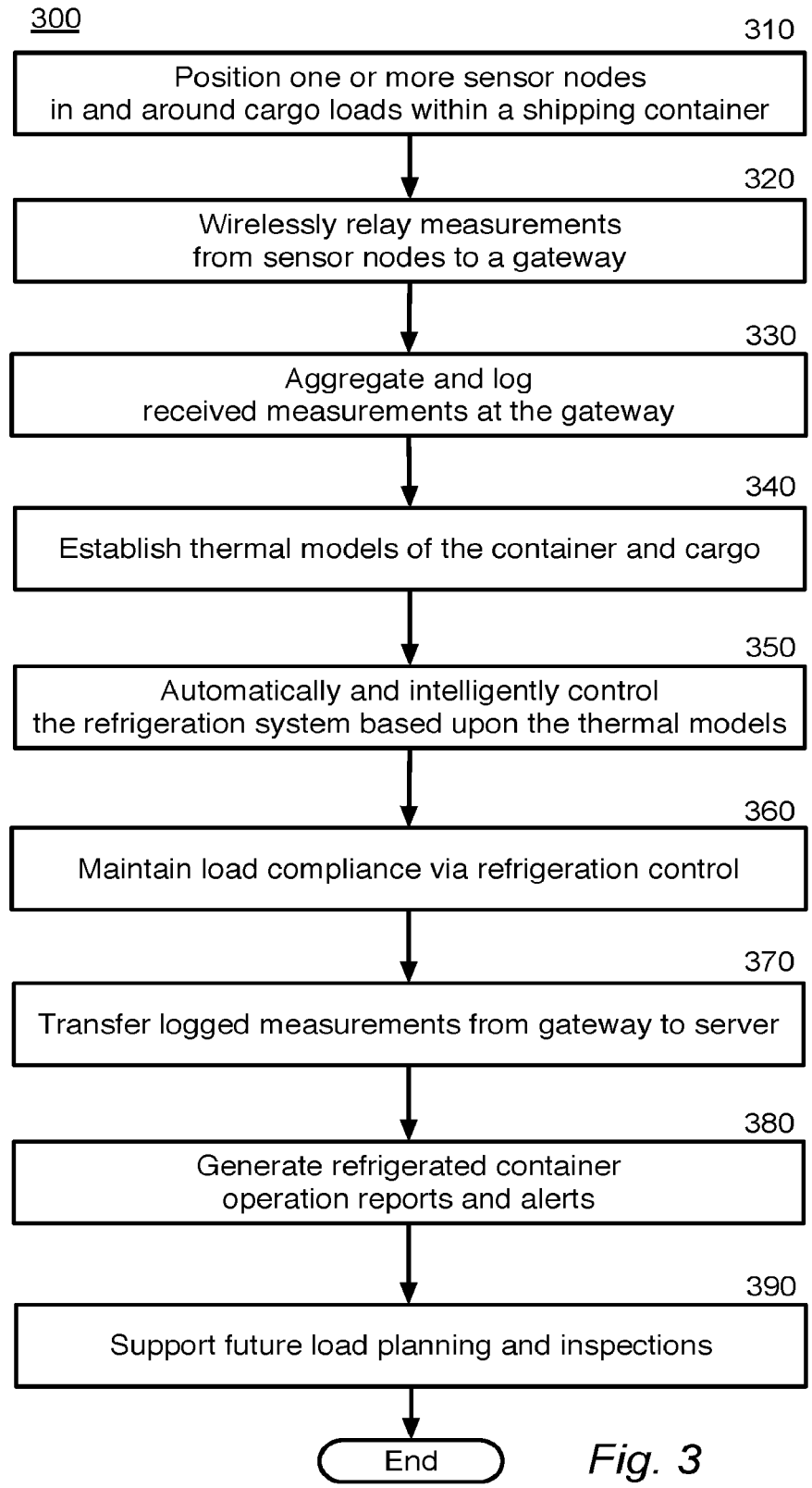
FIG. 3 is a block flow diagram depicting a method for multi-sensor, closed-loop refrigeration control in accordance with one or more embodiments of the technology presented herein.

FIG. 3 is a block flow diagram depicting a method 300 for multi-sensor, closed-loop refrigeration control in accordance with one or more embodiments presented herein. According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

In block 310, one or more sensor nodes 140 may be positioned in and around cargo loads 130 within a shipping container 100. The sensor nodes 140 may be distributed around the interior of the shipping container 100. One or more sensor nodes 140 may be positioned within, upon, or adjacent to one of the cargo loads 130. The sensor nodes 140 may be used to measure parameters, such as temperature and humidity, at multiple points within the shipping container 100.

In block 320, measurements from the sensor nodes 140 may be wirelessly relayed to a gateway 120. The gateway 120 may comprise a remote-control system for the container 100 operable to directly, or indirectly, control refrigeration functions for the container 100. The gateway 120 may be associated with the shipping container 100 such that some, or all, of the sensor nodes 140 within the shipping container 100 are in wireless communication with the gateway 120.

In block 330, received measurements may be aggregated and/or logged by or at the gateway.

In block 340, thermal models may be based upon the thermal properties of the container itself, and various cargo loads 130, the operation of the refrigeration system 110, the size and position of the various cargo loads 130, external temperatures, known power consumption, and so forth. The thermal models may be used to predict and estimate the temperature at points between or beyond the sensor nodes 140 according to interpolation, extrapolation, and thermal propagation physics. Thermal propagation physics may be computed from air flow, temperatures of the refrigerated air supply 112, flow rates of the refrigerated air supply 112, duty cycle of the refrigeration system 110, material composition of the various cargo loads 130, density of the various cargo loads 130, materials of the shipping container 100, external temperatures of the shipping container 100, the loading plan, and so forth. The thermal models can establish a three-dimensional temperature matrix at a high spatial resolution. The thermal models may include specific physical parameters associated with each of the cargo loads 130. For example, pharmacological loads may have a monetary value, a criticality metric (e.g., needed vaccines), thermal excursion limits, and susceptibility to excursion metrics. The thermal exclusion limits may specify minimum and maximum safe temperatures for the load. For example, a load may be safe between 0 and 20 degrees centigrade and must be kept within that range.

In block 350, thermal models can be used to automatically and intelligently control the refrigeration system 110. Control may be established over refrigeration temperature set points, refrigeration cycles, fan power, humidity control, and so forth.

In block 360, control of the refrigeration system can support maintaining load compliance. In best-case scenarios, the control can seek to maximize compliance of an entire load by maintaining temperatures (or other parameters) within the tolerance limits of all cargo loads 130. If the control system cannot make that goal, it may be forced to sacrifice one or more of the cargo loads 130. Analysis of the monetary values and criticality of the various loads 130 can support decisions that minimize loss while minimizing risks to health, welfare, or other human needs.

Example compliance parameters associated with food loads may include specification of mixed or homogeneous loads, freshness parameters (ripening cycles, first picked, first expired, first sold), agricultural product tracking (where harvested, when harvested, how stored, how slaughtered), marking for tracking (QR codes), USDA cold treatment automation process, and so forth.

In block 370, the logged measurements may be transmitted from the gateway 120 to the server 210. The transferred information may also include the results of modelling and analysis. The information may be transmitted by wireless communications between the gateway 120 and the server 210, which may be supported by gateway wireless channel 215. The server 210 may be on ship or fixed, for example at port. The gateway 120 can communicate, directly or indirectly, with the server 210 using a global cellular network, or other wireless mechanisms as presented herein. When there is no connection, the gateway 120 can store data and transmit it once connectivity is restored.

In block 380, operations reports and alerts associated with the refrigerated container 100 may be generated. The generated reports may be uploaded via the server 210 or other communications channel. System data can be provided in real-time using a Graphical User Interface. The system can support set-up and management of alarms, customizing alarms, notifications and reports that can be shared securely and selectively. The system can provide support to the shipper for establishing the cooling algorithm. The system can predict future system performance and may also provide alerts as appropriate.

In block 390, load planning and inspections may be supported by information collection and analysis associated with the gateway 120 and the server 210. Load planning intelligence can be provided with respect to size and position of the various cargo loads 130. The loan plan can instruct a shipper on how to pack the cargo loads 130 to maximize compliance or minimize risk of loss. This can include loading order and load height within the container. The system can detect load violations. For example, when cargo nearest refrigerated air supply 112 is stacked too high and blocking airflow.

The system can reduce terminal Pre-Trip Inspection (PTI) processes, which are usually performed on a refrigerated container before each use. Performing remote health checks to determining whether repair is necessary can support improved utilization and reduced repair costs. The system can also provide real-time alarm status on cold treatment shipments. The system can support remote change of temperature set point to avoid breach of protocol. The system can reduce handling cost. The system can increase cargo shelf life. The system can support quicker clearance through automated USDA approvals. The system can provide cargo-level temperature monitoring for better USDA and GDP compliance. The system can detect container breach for security. The system can reduce terminal quarantine time for USDA cold treatment operations. The system can provide customized real-time data to customers. The system can provide customized post-trip data to customers.

FIG. 4 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touchscreens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Based on the foregoing, it should be appreciated that technologies for wireless security associated with freight container seals are presented herein. Although the subject matter presented herein has been described in language specific to various example embodiments, it is to be understood that the invention disclosed herein is not necessarily limited to the specific features, materials, dimensions, or structures described herein. Rather, the specific features, materials, dimensions, and structures are disclosed as example forms of implementation. The subject matter described above is provided by way of illustration only and should not be construed as limiting. Various modifications, combinations, and changes may be made to the subject matter described herein without following the example embodiments and applications illustrated and described, and without departing from the true spirit and scope of the present invention.

The invention claimed is:

1. A method for refrigeration control in a freight container in active transit, the method comprising:
wirelessly receiving, at a gateway, measurements from a first sensor node and a second sensor node, wherein,
the measurements include at least one of temperature, humidity, and light detected by the sensor nodes, and
the first sensor node is stored inside of a cargo load stored inside of the freight container, and
the second sensor node is stored outside of the cargo load and inside of the freight container;
establishing a predictive thermal model from the measurements over time and operation of the refrigeration system; and
controlling a refrigeration system in the freight container to preserve cargo stored inside of the cargo load, wherein the controlling includes inputting the measurements into the predictive thermal model to estimate physical parameters of the cargo between the sensor nodes.

2. The method of claim 1, wherein the wirelessly receiving uses at least one of a satellite network, a cellular network, and Long Range (LoRa) modulation standard.

3. The method of claim 1, wherein the gateway is co-located with the freight container, the method further comprising:
wirelessly transmitting, from the gateway to a server, the measurements, wherein the server is remote from the freight container and not in transit, and wherein the wirelessly transmitting uses at least one of a satellite network, a cellular network, and Long Range (LoRa) modulation standard.

4. The method of claim 1, wherein the establishing further includes establishing the predictive thermal model from thermal properties of the freight container and thermal properties of the cargo load.

5. The method of claim 1, wherein the predictive thermal model is a temperature field within the freight container and cargo load.

6. The method of claim 1, wherein the freight container contains,
a plurality of the cargo loads each with a first sensor node stored inside, and
a plurality of the second sensor nodes outside the cargo loads inside the freight container, wherein the measurements include measurements from all of the first and all of the second sensor nodes.

7. The method of claim 6, wherein the controlling includes allowing one of the cargo loads to exceed a temperature limit and sacrificing the one of the cargo loads to preserve temperature limit compliance of another of the cargo loads.

8. The method of claim 7, wherein the one of the cargo loads sacrificed has a lower monetary value or importance value than the another of the cargo loads.

9. The method of claim 1, wherein,
the freight container is an intermodal container standardized for operation in shipping, railroad, and trucking,
the refrigeration system is a closed-loop refrigeration system intaking air from and inputting cooled air into the freight container, and
the wirelessly receiving uses an electromagnetic interface that passes through the cargo loads and the freight container.

10. A refrigeration control system for use in a freight container in active transit, the system comprising:
a first sensor node configured to store inside of a cargo load stored inside of the freight container;
a second sensor node configured to store outside of the cargo load and inside of the freight container, wherein the first and the second sensor nodes measure at least one of temperature, humidity, and light; and
a gateway associated with the freight container not inside any cargo load and configured to, wirelessly receive the measurements from the first sensor node and the second sensor node,
establish a predictive thermal model from the measurements over time and operation of the refrigeration system, and
control a refrigeration system in the freight container to preserve cargo stored inside of the cargo load, wherein the controlling includes inputting the measurements into the predictive thermal model to estimate physical parameters of the cargo between the sensor nodes.

11. The system of claim 10, wherein the gateway is configured to wirelessly communicate on at least one of a satellite network, a cellular network, and Long Range (LoRa) modulation standard.

12. The system of claim 10, further comprising:
the refrigeration system, wherein the gateway and the refrigeration system are co-located with the freight container, wherein the gateway is further configured to wirelessly transmit, to a server, the measurements, wherein the server is remote from the freight container and not in transit, and wherein the wirelessly transmitting uses at least one of a satellite network, a cellular network, and Long Range (LoRa) modulation standard.

13. The system of claim 12, further comprising:
the freight container, wherein the freight container is an intermodal container standardized for operation in shipping, railroad, and trucking, and wherein the refrigeration system is a closed-loop refrigeration system intaking air from and inputting cooled air into the freight container.

14. The system of claim 10, wherein the gateway is further configured to establish the predictive thermal model from thermal properties of the freight container and thermal properties of the cargo load, wherein the predictive thermal model is a temperature field within the freight container and cargo load.

15. The system of claim 10, further comprising;
a plurality of the first sensor nodes each configured to store inside of a cargo load inside the freight container; and
a plurality of the second sensor nodes each configured to store outside the cargo loads inside the freight container, wherein the measurements include measurements from all of the first and all of the second sensor nodes.

16. The system of claim 10, wherein the gateway is further configured to allow one of the cargo loads to exceed a temperature limit and sacrifice the one of the cargo loads to preserve temperature limit compliance of another of the cargo loads having a higher monetary value or importance value than the one of the cargo loads sacrificed.

17. A method for refrigeration control in a freight container in active transit, the method comprising:
wirelessly receiving, at a gateway, measurements from a first sensor node and a second sensor node, wherein,
the measurements include at least one of temperature, humidity, and light detected by the sensor nodes, and
the first sensor node is stored inside of a cargo load stored inside of the freight container, and
the second sensor node is stored outside of the cargo load and inside of the freight container; and
controlling a refrigeration system in the freight container based on the measurements to preserve cargo stored inside of the cargo load, wherein the controlling includes allowing one of the cargo loads to exceed a temperature limit and sacrificing the one of the cargo loads to preserve temperature limit compliance of another of the cargo loads.

* * * * *